No. 888,379. PATENTED MAY 19, 1908.
C. ACKER & G. R. GLOSSOP.
COMBINED SHAFT AND POLE FOR VEHICLES.
APPLICATION FILED DEC. 31, 1906.
3 SHEETS—SHEET 2.
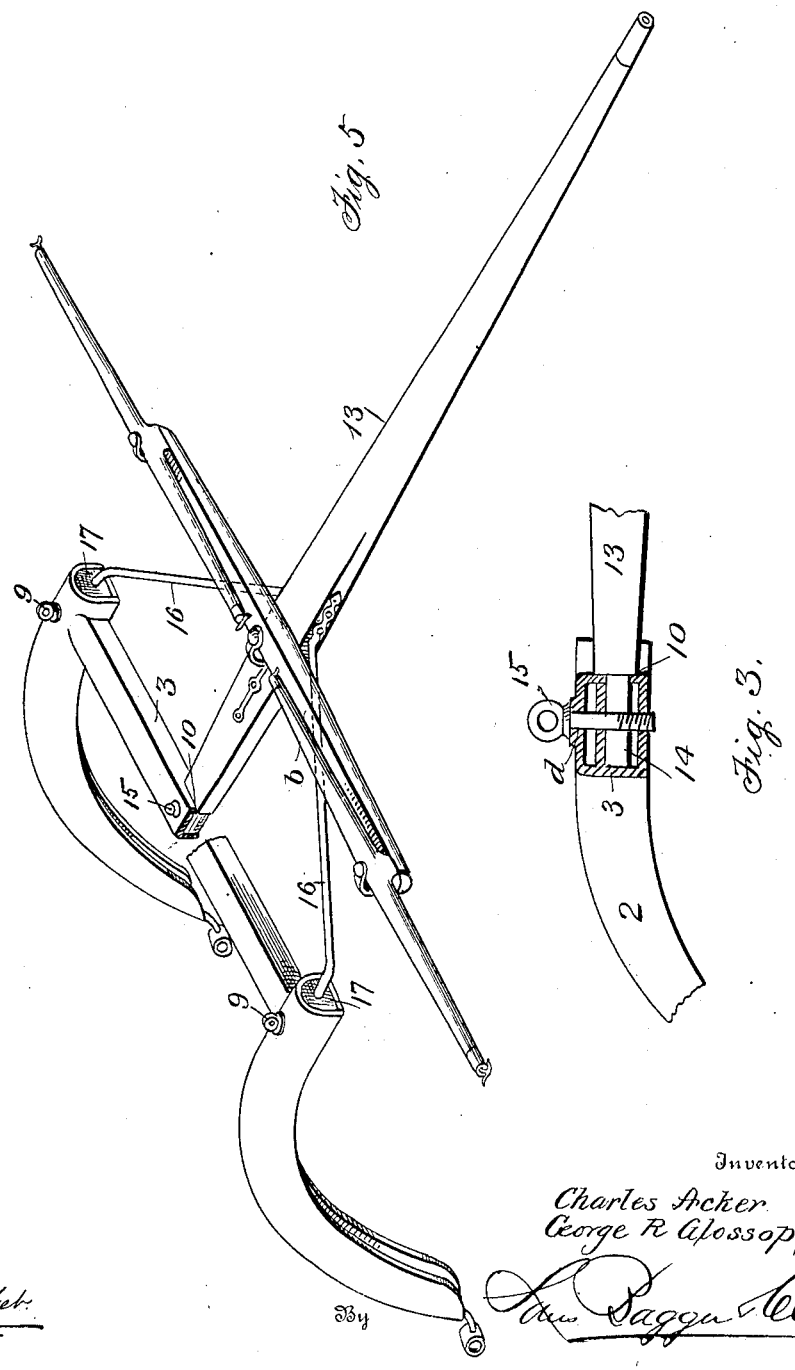
Witnesses:
Inventors:
Charles Acker
George R. Glossop,
By
Attorneys

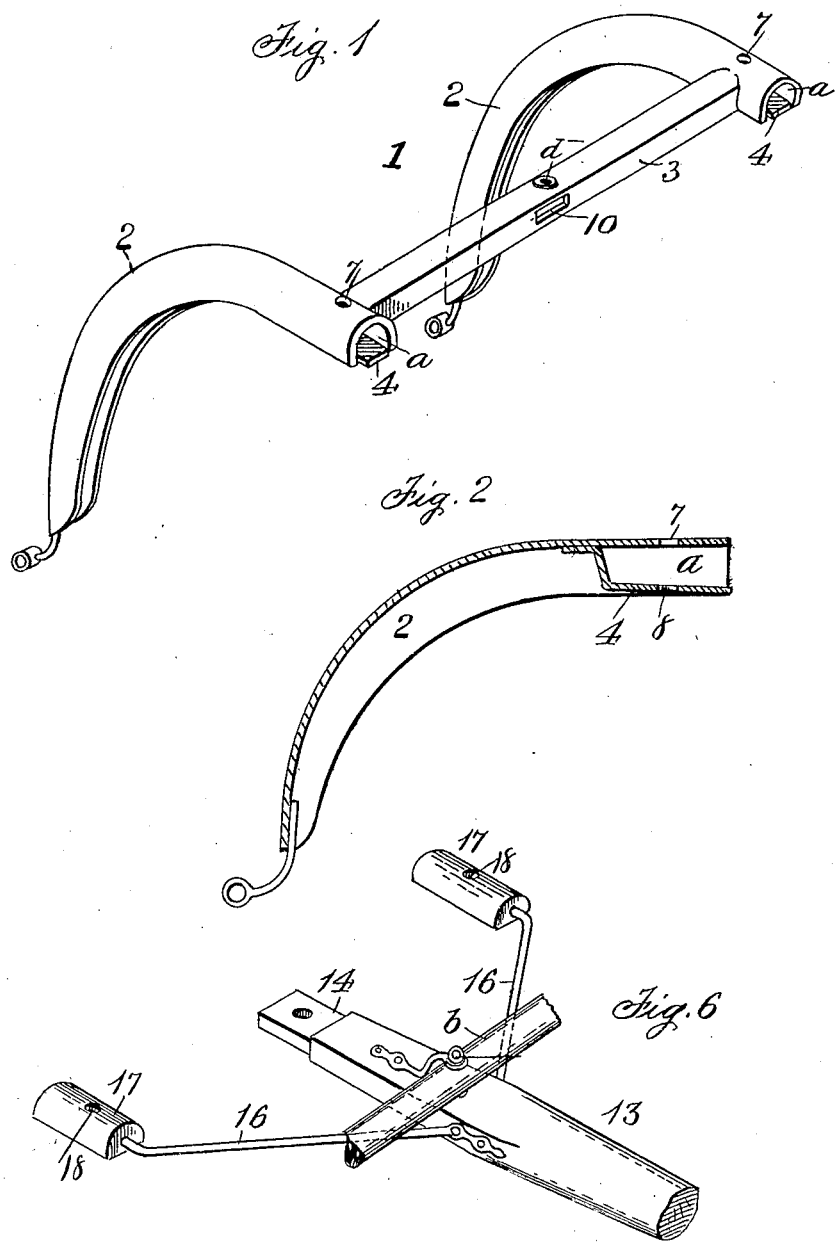

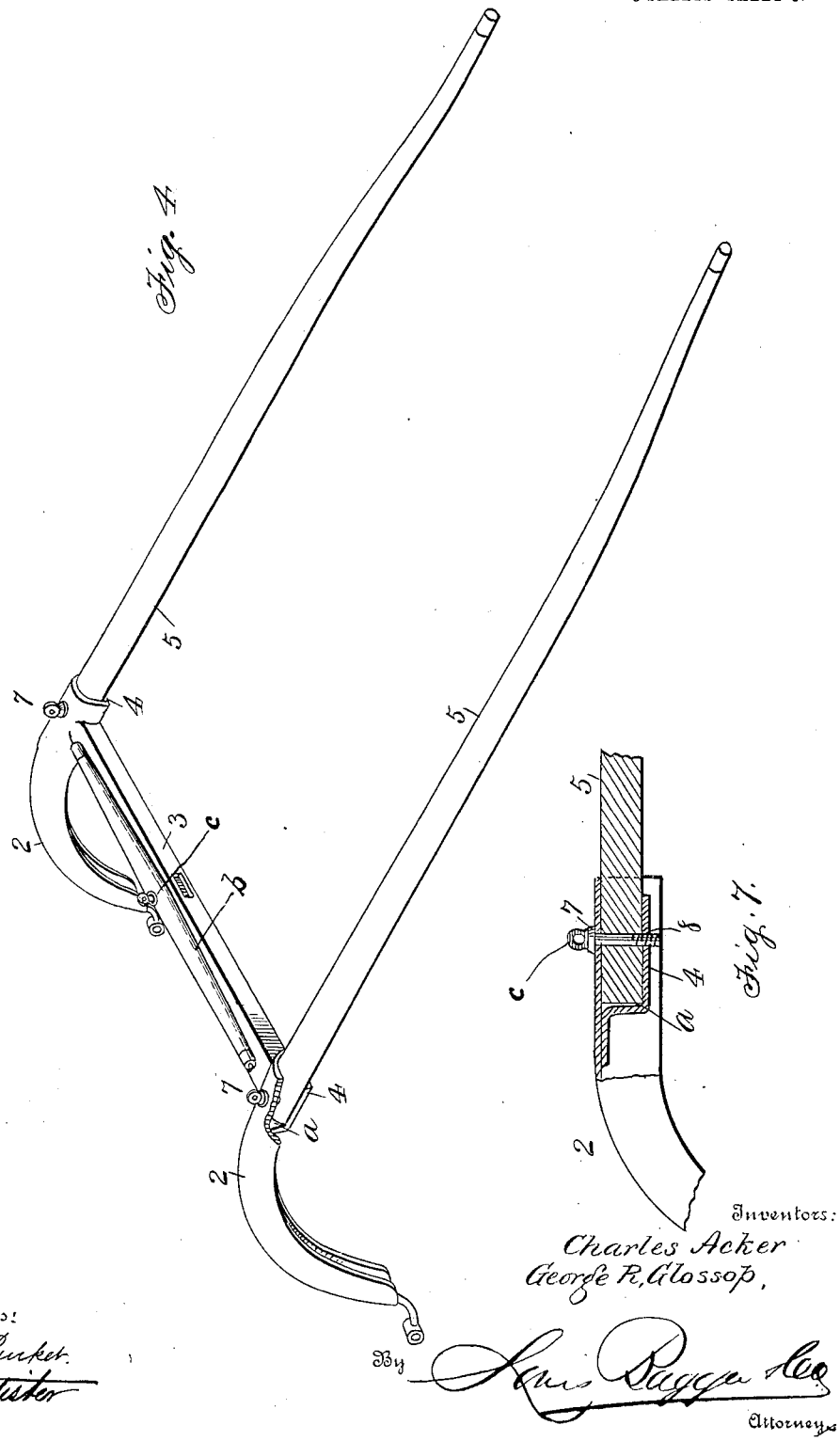

UNITED STATES PATENT OFFICE.

CHARLES ACKER AND GEORGE R. GLOSSOP, OF RUSHVILLE, ILLINOIS.

COMBINED SHAFT AND POLE FOR VEHICLES.

No. 888,379.     Specification of Letters Patent.     Patented May 19, 1908.

Application filed December 31, 1906. Serial No. 350,203.

*To all whom it may concern:*

Be it known that we, CHARLES ACKER and GEORGE R. GLOSSOP, citizens of the United States, residing at Rushville, in the county of Schuyler and State of Illinois, have invented certain new and useful Improvements in Combined Shafts and Poles for Vehicles, of which the following is a specification.

Our invention relates to improvements in combined shafts and poles for vehicles. Its objects are, primarily, to provide for the ready conversion of the device for use as shafts for a single horse or as a pole for a team of horses; to simplify construction and promote economy of manufacture; and to carry out these ends in an expeditious and effective manner.

Said invention consists of certain structural features or instrumentalities substantially as hereinafter fully disclosed and specifically pointed out by the claims.

In the accompanying drawing illustrating the preferred embodiment of our invention—Figure 1 is a perspective view of said invention. Fig. 2 is a vertical section taken through one of the thill or shaft receiving sockets or arms of said invention. Fig. 3 is a like section produced through the whiffletree pole receiving socket of the cross-bar thereof. Fig. 4 is a perspective view, showing the shafts or thills in position, with one of the thill or shaft receiving sockets or arms in section. Fig. 5 is a like view, showing the pole in position, with the pole receiving socket in section. Fig. 6 is a broken perspective view of the pole and adjunctive parts. Fig. 7 is a broken detailed section showing more particularly a shaft coupling or connection.

In carrying out our invention, we provide a preferably metallic member 1, constituting the salient feature thereof and which consists of two preferably curved metallic arms 2, effective for attachment to a vehicle front-axle, and of a cross-bar 3 integral with said arms. Said arms and cross-bar are preferably of shell-like or hollow construction for lightness, in addition to aid in serving as sockets for a purpose presently disclosed. Said lateral or arm members have suitably secured or fixed within their upper or receiving ends bent spring-metal tongues or clasps 4 offset at their free ends from the inner upper surfaces of said arms, whereby are formed sockets $a$ for readily receiving the inner end-portions of the shafts or thills 5 when it may be desired to use the same, as for a single horse or animal. Said tongues or clasps and the opposed portions of said arms are provided with coinciding apertures 7, 8, respectively for receiving preferably screw-threaded pins or bolts 9 inserted or screwed through suitable apertures in said shafts where they enter the sockets of said arms thus providing for the effective retention of the shafts therein, while permitting of the ready withdrawal or detachment of the shafts or thills when it may be desired to use more than a single horse or a team of two or more horses. Said tongue-like clasps by reason of their spring-action, will, as they are forced downward in effecting the insertion of the shaft-member ends into the sockets in the arms 2 again spring to their normal positions and thus exert a clasping or clamping action upon said shaft-members. Within the cross-bar 3, centrally thereof, is also provided a socket 10, opening out through the forward side thereof, the same being preferably formed of an upper, and a lower plate soldered or brazed to opposed surfaces or portions of said cross-bar and having openings therethrough registering with each other and with the openings $d$ in the upper surface of said cross-bar. Means for the attachment of a swingle or whiffletree $b$ to said cross-bar member 3 is also provided by the employment of a preferably screw-threaded pin or bolt $c$ inserted through an aperture $d$ produced in said cross-bar about at its center, and through said whiffletree.

A pole-member 13, equipped with cross and whiffletrees, as usual, is provided for adapting the device for using a team of two or more animals, said member having its inner end formed with a tension-like tongue 14 for insertion into the sockets 10 of the cross-bar 3, and to receive also a screw-threaded pin or bolt 15 for fixing the same in place. Said pole-member 13 is also provided at its inner end with lateral braces 16, preferably in the form of rods and equipped at their free ends with blocks or plugs 17 adapted to enter the sockets $a$ of the lateral arms 2 having apertures or holes 18 therein to register with the apertures or openings 8 in said arms and which apertures receive the screw-threaded pins or bolts previously used for securing in place in the same sockets the shaft-members. Thus, it will be noted, is provided a simple, convenient and effective means for using either a single horse, or a team of two or more horses, as may be desired for attachment to a vehicle.

We claim—

A draft attachment for vehicles comprising hollow metal arms and integral crossbar, said arms having sockets formed at their forward ends, and spring tongues or clasps secured at one end in said arms and forming one side of said sockets, a tongue or shafts removably held in the sockets and means removably inserted to retain said parts within the sockets.

In testimony whereof we affix our signatures, in presence of two witnesses.

CHARLES ACKER.
GEORGE R. GLOSSOP.

Witnesses:
H. G. ESSLINGER,
B. O. WILLARD.